C. V. LUCIUS.
HIGH PRESSURE CONTAINER.
APPLICATION FILED MAR. 20, 1918.
1,291,956.
Patented Jan. 21, 1919.
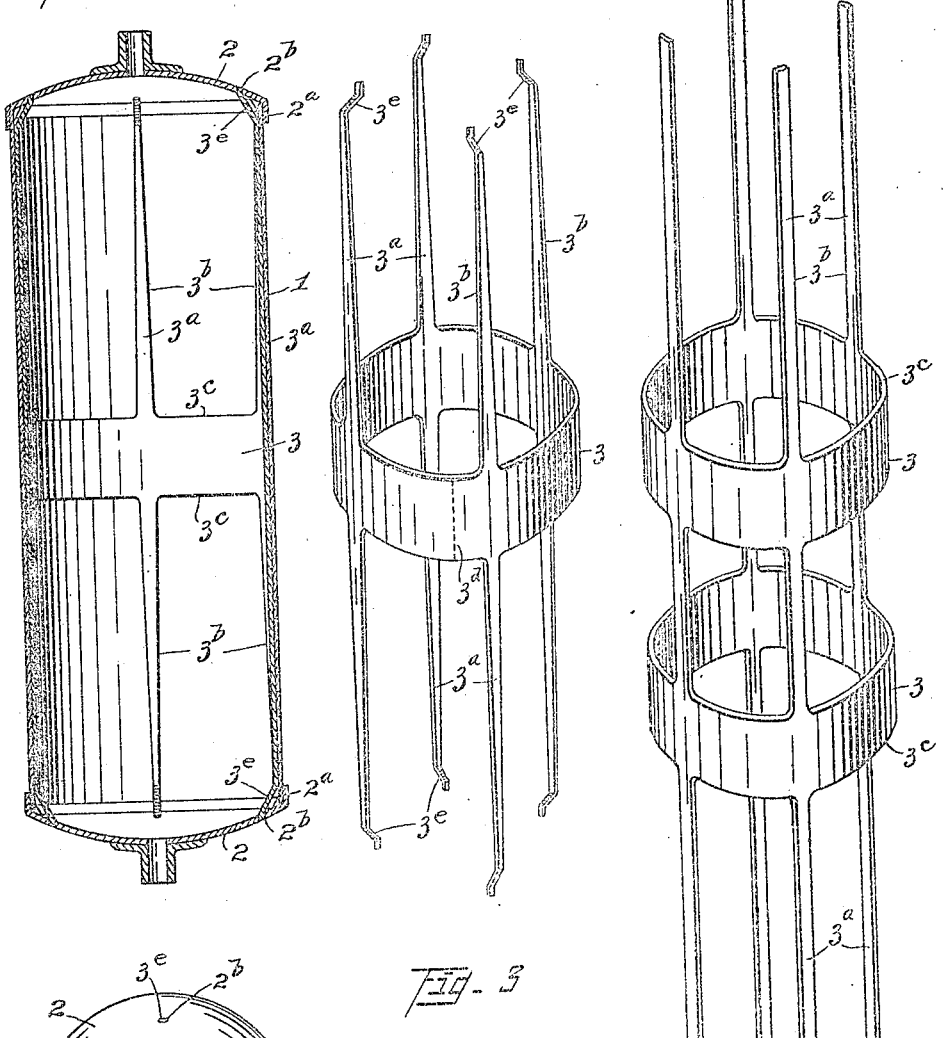
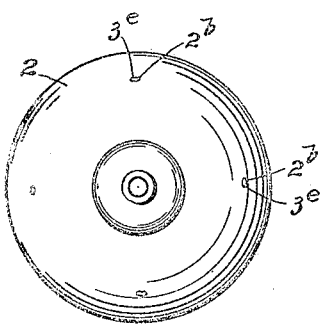
Inventor
C. V. Lucius
By Chas. S. Billman Atty.

UNITED STATES PATENT OFFICE.

CHRISTIAN V. LUCIUS, OF WOOSTER, OHIO.

HIGH-PRESSURE CONTAINER.

1,291,956.  Specification of Letters Patent.  Patented Jan. 21, 1919.

Application filed March 20, 1918.  Serial No. 223,535.

*To all whom it may concern:*

Be it known that I, CHRISTIAN V. LUCIUS, a citizen of the United States, residing at Wooster, in the county of Wayne and State of Ohio, have invented certain new and useful Improvements in High-Pressure Containers, of which the following is a specification.

My invention relates to improvements in high pressure containers, such for example, as high pressure fluid tanks extensively employed for the reception and storage of high pressure fluids.

The primary object of the invention is to provide a generally improved high pressure container or tank of this class which will be exceedingly simple in construction, cheap of manufacture and efficient in use.

The invention relates more particularly to an improved reinforcing frame or welding spider adapted to be arranged within and welded to the container body or tank whereby to securely reinforce and unite or tie together the walls thereof in their original or assembled position as against distortion or separation from internal pressures.

With the above mentioned and other ends in view, the invention consists in the novel construction, arrangement, and combination of parts, hereinafter described, illustrated in some of its embodiments in the accompanying drawings and particularly pointed out in the appended claims.

Referring to the drawings, forming a part of this specification, Figure 1, is a central longitudinal sectional view of a high pressure container or tank constructed in accordance with this invention.

Fig. 2, an end view of the same.

Fig. 3, a perspective view of the improved reinforcing spider, detached.

Fig. 4, a similar view of a modified form of same.

Similar numerals of reference designate like parts throughout all the figures of the drawings.

The container or tank may be of any suitable and convenient form, and in the present instance comprises a cylindrical body 1, provided at its ends with heads 2. The heads or ends 2, may be secured to the side walls or body 1, in any suitable and convenient manner, as for example,—by means of flanges $2^a$, welded or otherwise suitably secured to the marginal ends of the body 1.

As a means of reinforcing and securely connecting or tying together the side and end walls 1 and 2, for holding the parts in their original positions as against internal pressures an internal weldable reinforcing frame or spider is provided, said frame or spider, in the present instance, comprising a main reinforcing member or spider body 3, arranged within and welded to the median or intermediate portions of the body 1, said spider body 3, in the present instance, being in the specific form of a reinforcing weldable ring, particularly adapted for use in connection with a container having a cylindrical body as shown.

As a means of bridging and connecting the parts together, and particularly as a means of connecting the heads or ends 2; to each other and causing one part to reinforce and become in effect a part of the other part, the spider body or ring member 3, is provided with oppositely extending weldable truss arms or rods $3^a$, extending longitudinally within and welded to the side walls 1, said arms or tie rods $3^a$, extending through openings $2^b$, in the heads or end walls 2, and secured thereto in any suitable convenient manner, preferably by means of a welding process known as "autogenous welding".

As a means of adapting the reinforcing or weldable spider frame to this particular welding process, such spider is made of suitable sheet metal weldable material, the edges $3^c$, of the ring or spider body 3, and the edges $3^b$, of the truss or tie arms $3^a$, being particularly well adapted to receive and carry a welding of this class, securely uniting such edges $3^b$, and $3^c$, to the interior of the cylindrical body 1.

If desired, the spider may be cut or blanked out of a single blank of suitable sheet material and the adjacent edges of the ring or spider member 3, united by a suitable line of welding $3^d$, as illustrated in Fig. 3, of the drawings.

As a means of more securely connecting or maintaining the heads or ends 2, in their connected positions, the ends of the truss arms or tie rods $3^a$, are preferably provided with off-set bridge members $3^e$, extending across or bridging the annular angular space between the marginal edges of the body 1, and heads 2, the openings $2^b$, in the heads or ends 2, being correspondingly inset for this purpose, and the construction referred to affording obvious advantages.

If desired, the main reinforcing body or spider member may comprise a plurality of ring members 3, suitably spaced as shown in Fig. 4, of the drawings, this form of reinforcing weldable spider being particularly designed and adapted for use in connection with container bodies or tanks of considerable length.

From the foregoing description, taken in connection with the accompanying drawings, the operation and advantages of my invention will be readily understood.

Having thus described some of the embodiments of my invention, what I claim and desire to secure by Letters Patent, is,—

1. In a container, an interior reinforcing weldable spider having truss arms welded to the side and end walls thereof at points removed from the meeting edges of said walls.

2. A high pressure container, comprising side and end walls, and a reinforcing body having its edges welded within said side walls and provided with truss rods connected to and bridging the space between said end walls.

3. In a container, the combination with a cylindrical body provided with heads; of a spider body welded within said cylindrical body and provided with body welding arms having off-set bridge members connected to said heads at points within said body.

4. A high pressure container, comprising side and end walls, and a median reinforcing body having welding edges welded within said side walls and provided with oppositely extending truss arms welded to and bridging the space between said side and end walls.

5. A high pressure container, comprising a cylindrical body provided with heads, and a spider ring member provided with oppositely extending truss rods connected to said heads at points within said body, said ring and truss rods having their edges welded to said cylindrical body.

6. A high pressure container, comprising a cylindrical body provided with welded flanged heads, and a spider ring member provided with oppositely extending truss rods having bridge members connected to said heads, said ring and truss rods being welded to said cylindrical body and said bridge members extending across the annular space between the inner marginal portions of said body and heads.

7. A high pressure container, comprising a cylindrical body provided with heads having openings inset from the marginal edges thereof, and a spider body comprising a reinforcing median ring arranged within and having its marginal edges welded to the adjacent portions of the cylindrical body, said ring having truss arms arranged within and welded to said cylindrical body and terminating in off-set bridge members extending into and welded in said inset openings of said heads.

8. A high pressure container, comprising a cylindrical body provided with heads having openings inset from the marginal edges thereof, and a spider body comprising a reinforcing ring arranged within and having its marginal edges welded to the adjacent portions of the cylindrical body, said ring having tapered truss arms arranged within and having their tapered side edges welded to said cylindrical body and terminating in off-set bridge members welded in said inset openings of said heads.

In testimony whereof I have affixed my signature in the presence of two witnesses.

CHRISTIAN V. LUCIUS.

Witnesses:
A. H. SARWICHL,
JOSEPH O. FRITZ.

Copies of this patent may be obtained for five cents each, by addressing the "Commissioner of Patents, Washington, D. C."